(12) United States Patent
Chiu et al.

(10) Patent No.: US 10,596,712 B2
(45) Date of Patent: Mar. 24, 2020

(54) BRAKE TRIGGERING DEVICE FOR A ROBOT ARM

(71) Applicant: QUANTA STORAGE INC., Taoyuan (TW)

(72) Inventors: Sheng-Wen Chiu, Taoyuan (TW); Yao-Ting Kuo, Taoyuan (TW)

(73) Assignee: QUANTA STORAGE INC., Taoyuan (TW)

( * ) Notice: Subject to any disclaimer, the term of this patent is extended or adjusted under 35 U.S.C. 154(b) by 23 days.

(21) Appl. No.: 16/027,247

(22) Filed: Jul. 3, 2018

(65) Prior Publication Data

US 2019/0030735 A1 Jan. 31, 2019

(30) Foreign Application Priority Data

Jul. 25, 2017 (CN) .......................... 2017 1 0609422

(51) Int. Cl.
*F16D 63/00* (2006.01)
*B25J 19/00* (2006.01)
*B25J 17/00* (2006.01)
*B25J 18/00* (2006.01)

(52) U.S. Cl.
CPC ........ *B25J 19/0004* (2013.01); *F16D 63/006* (2013.01); *B25J 17/00* (2013.01); *B25J 18/00* (2013.01)

(58) Field of Classification Search
CPC .......................... B25J 19/0004; F16D 65/186; F16D 2121/20; F16D 2125/64
USPC ........................................................ 188/171
See application file for complete search history.

(56) References Cited

U.S. PATENT DOCUMENTS

| 3,095,068 | A | * | 6/1963 | Hansen | F16D 23/12 188/171 |
| 3,682,279 | A | * | 8/1972 | Palme | F16D 55/36 188/171 |
| 4,181,201 | A | * | 1/1980 | McCarthy | F16D 55/28 188/171 |
| 4,570,758 | A | * | 2/1986 | Hendricks | F16D 55/36 188/171 |
| 4,700,932 | A | * | 10/1987 | Katsuno | B25J 19/063 188/266.2 |
| 4,798,269 | A | * | 1/1989 | Lindner | F16D 55/28 188/171 |
| 5,186,287 | A | * | 2/1993 | Lindner | F16D 55/36 188/171 |
| 5,421,436 | A | * | 6/1995 | Lindner | F16D 55/36 188/1.11 R |
| 2009/0145699 | A1 | * | 6/2009 | Jonsson | B25J 19/0004 188/1.11 L |
| 2015/0292580 | A1 | * | 10/2015 | Fichtner-Pflaum | F16D 55/36 188/161 |
| 2016/0121492 | A1 | * | 5/2016 | Tsai | B25J 19/0004 74/490.03 |

(Continued)

*Primary Examiner* — Bradley T King
(74) *Attorney, Agent, or Firm* — Winston Hsu

(57) ABSTRACT

A brake triggering device for a robot arm is provided in the invention, and the brake triggering device includes a controlling plate with an enhanced structural strength by its annularly symmetrical structure. By designating an end of the ring-shaped controlling plate as a pivot and actuating the opposite end, a movable end, with a solenoid, pressing protrusions protruding from the two sides of an inner rim of the controlling plate can provide a greater torque for braking.

10 Claims, 5 Drawing Sheets

(56) References Cited

U.S. PATENT DOCUMENTS

2018/0200896 A1* 7/2018 Boyland ................ H02K 7/102
2019/0274779 A1* 9/2019 Fukushima ........ G02B 21/0012

* cited by examiner

BRAKE TRIGGERING DEVICE FOR A ROBOT ARM

BACKGROUND OF THE INVENTION

1. Field of the Invention

The invention relates to a brake triggering device, and more particularly, to a brake triggering device for a robot arm.

2. Description of the Prior Art

In factory automation application, a robot arm shifts between designated positions to pick up or place a work piece for assembly and production, thereby improving productivity. To operate precisely, the shifting robot arm relies not only on power supplied by a driving module but also on a stable and efficient braking apparatus to properly brake the robot arm at the designated positions.

The U.S. Pat. No. 8,410,732 discloses that a driving module for a robot arm provides power for shifting the robot arm via a shaft, which is driven and rotated by a motor after being decelerated by a decelerator. The driving module further includes a braking apparatus, whose friction ring is fixed on the shaft and is surrounded by a ratchet on the outer rim of the fiction ring. The driving module further includes a solenoid to clutch the ratchet, that is, to block or to release the rotation of the ratchet, so as to trigger the brake for the rotation of the motor, and thereby the shifting robot arm is stopped. However, the friction ring and the ratchet of the driving module of the prior art are directly fixed to the shaft, which are too close to the shaft to exert a sufficient braking torque for stopping the shifting robot arm efficiently when the solenoid is engaged with the ratchet.

Please refer to FIG. 5. FIG. 5 is a diagram of a conventional brake triggering device in the prior art. As shown in FIG. 5, another U.S. Pat. No. 9,579,805 submitted by the applicant discloses a U-shaped controlling plate 1 pivoted around a closed end with a supporting axle 2. Two supporting arms 3 are extended from two ends of the supporting axle 2 respectively and towards two sides of a shaft 4. A solenoid valve exerts an actuating force F on one of the supporting arms 3 so as to pivot the supporting arms 3 around the supporting axle 2, and thereby an engaging plate 5 is pressed by the supporting arms 3 against a restoring spring (not shown in figures). In the operation of the brake triggering device, engaging pins 6 on the pressed engaging plate 5 can move away from the rotation path of the ratchet 7 coupled with the shaft 4 for allowing the shaft 4 to actuate the robot arm. Alternatively, the two supporting arms 3 can release the engaging plate 5 so that the restoring spring pushes the engaging plate 5 for driving the engaging pins 6 thereon to enter the rotation path of the ratchet 7, and thereby the rotation of the ratchet 7 is stopped. The shaft 4 is then stopped along with the hindered ratchet 7 via a braking friction provided by a brake disk 8 linked with the engaging plate 5, and thereby the shifting robot arm is stopped. Since the engaging pins 6 are disposed remarkably away from the shaft 4 and the brake disk 8 has a comparatively large area, it can provide a greater braking torque.

However, the aforesaid actuating force F from the solenoid of the prior art is exerted only on one of the supporting arms 3 of the U-shaped controlling plate 1, which causes unbalanced forces generated by the two supporting arms 3 to press the engaging plate 5, leading to possible deformation of the controlling plate 1 and affecting the braking process. Also, an engaging friction force arising from an engagement between the ratchet 7 and the engaging pins 6 varies with the load of the robot arm, wherein a greater load forcefully presses the ratchet 7 against the engaging pins 6, which is unfavorable for the detachment of the engaging pins 6 from the ratchet 7 and requires an elevated actuating force F from the solenoid to trigger the controlling plate 1 for a brake release, thus causing a waste of electric power and increasing difficulty in brake control for the robot arm. Therefore, it is necessary to develop a brake triggering device for a robot arm to solve the aforesaid problems.

SUMMARY OF THE INVENTION

An objective of the present application is to provide a brake triggering device for a robot arm which includes a controlling plate formed in a ring shape to improve the structural strength of the controlling plate so as to bear the actuating force exerted by a solenoid.

Another objective of the present application is to provide a brake triggering device including a controlling plate, where an end of the controlling plate is designated to be a pivot and another end of the controlling plate opposite to the end of the controlling plate is actuated by a solenoid. Two pressing protrusions protrude from two sides of an inner rim of the controlling plate respectively so as to provide a greater triggered braking torque.

To achieve the above objectives, the embodiment of the present application provides a brake triggering device which includes a brake disk with a central shaft hole. A pivot holder is disposed at an end of the brake disk. A plurality of positioning pins protrude from the brake disk and surround the central shaft hole. At least one restoring spring sleeves at least one of the plurality of positioning pins. A plurality of through holes are formed on the engaging plate for allowing the plurality of positioning pins to slide through the plurality of through holes respectively. The at least one restoring spring is positioned between the engaging plate and the brake disk. A plurality of engaging blocks protrude from the engaging plate. A controlling plate is formed in a ring shape. A pivot is disposed at an end of the controlling plate and disposed in the pivot holder. Another end of the controlling plate opposite to the end of the controlling plate is a movable end to be pivoted around the pivot and above the engaging plate. Two pressing protrusions protrude from two sides of the controlling plate and positioned above the engaging plate respectively. A solenoid is disposed above the movable end of the controlling plate for pushing or releasing the movable end. The solenoid actuates the movable end of the controlling plate to pivot the controlling plate around the pivot for driving the two pressing protrusions at the two sides of the controlling plate to push the engaging plate against the at least one restoring spring or to separate from the engaging plate, so as to lower or lift the plurality of engaging blocks on the engaging plate respectively.

A plurality of guiding slots are spaced around the central shaft hole of the brake disk, and an inner rim of the engaging plate is engaged in the plurality of guiding slots. The solenoid drives an actuating rod to extend out of or to retract into the solenoid for pushing or releasing the movable end respectively. The two pressing protrusions protrude from two sides of an inner rim of the controlling plate respectively. The two pressing protrusions can also protrude from opposite sides of the controlling plate respectively, where a diametric line connecting between the pressing protrusions is substantially perpendicular to a diametric line connecting between the pivot and the movable end of the controlling plate.

In summary, the brake triggering device of the present application utilizes the solenoid to push the movable end of the controlling plate so as to pivot the controlling plate around the pivot for driving the two pressing protrusions at the two sides of the controlling plate to push the engaging plate against the restoring springs so as to lower the engaging blocks on the engaging plate for releasing the brake. Alternatively, the solenoid releases the movable end of the controlling plate to pivot the controlling plate around the pivot so as to drive the pressing protrusions at the two sides of the controlling plate to release the engaging plate, and thereby the restoring spring is allowed to lift the engaging blocks on the engaging plate for braking.

These and other objectives of the present invention will no doubt become obvious to those of ordinary skill in the art after reading the following detailed description of the preferred embodiment that is illustrated in the various figures and drawings.

DETAILED DESCRIPTION

The technical features and inventive characteristics of the present application for achieving the above objectives are exemplified by preferred embodiments and illustrated by figures as follows.

Certain terms are used throughout the following description and claims to refer to particular system components. As one skilled in the art will appreciate, manufacturers may refer to a component by different names. In the following discussion and claims, the system components are differentiated not by their names but by their function and structure differences. In the following discussion and claims, the terms "include" and "comprise" are used in an open-ended fashion and should be interpreted as "include but is not limited to". Also, the term "couple" or "link" is intended to mean either an indirect or a direct mechanical or electrical connection. Thus, if a first device is coupled or linked to a second device, that connection may be through a direct mechanical or electrical connection, or through an indirect mechanical or electrical connection via other devices and connections.

Figure 1:
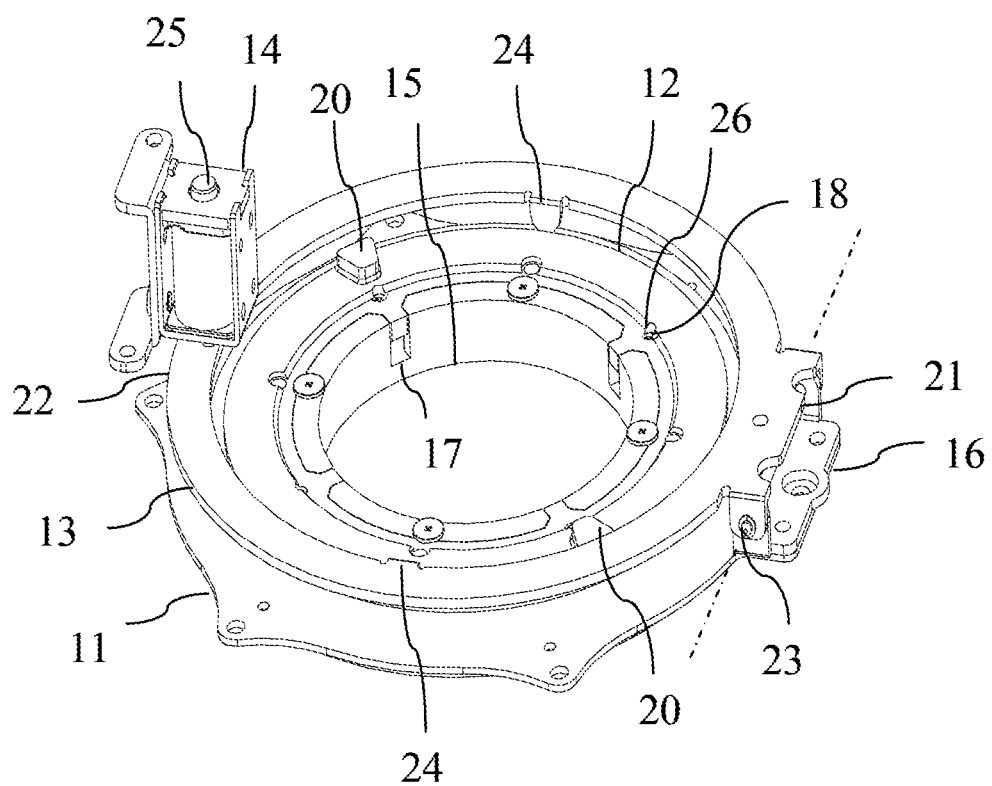
FIG. 1 is a diagram of a brake triggering device for a robot arm according to an embodiment of the present application.
Figure 2:
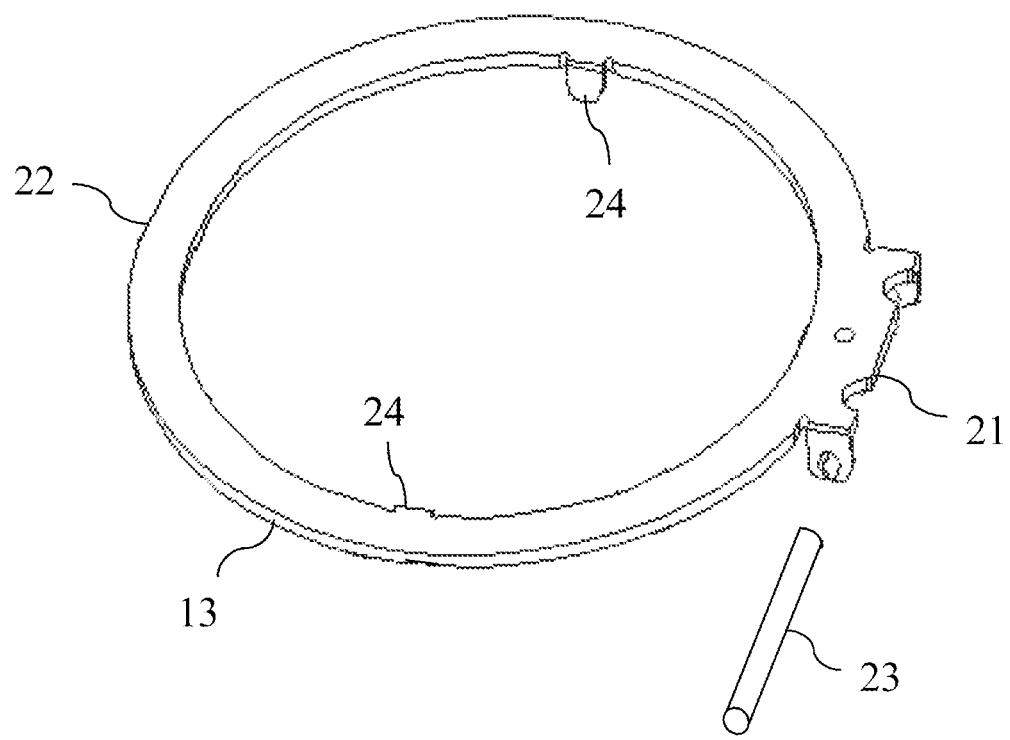
FIG. 2 is a diagram of a controlling plate according to the embodiment of the present application.
Figure 3:
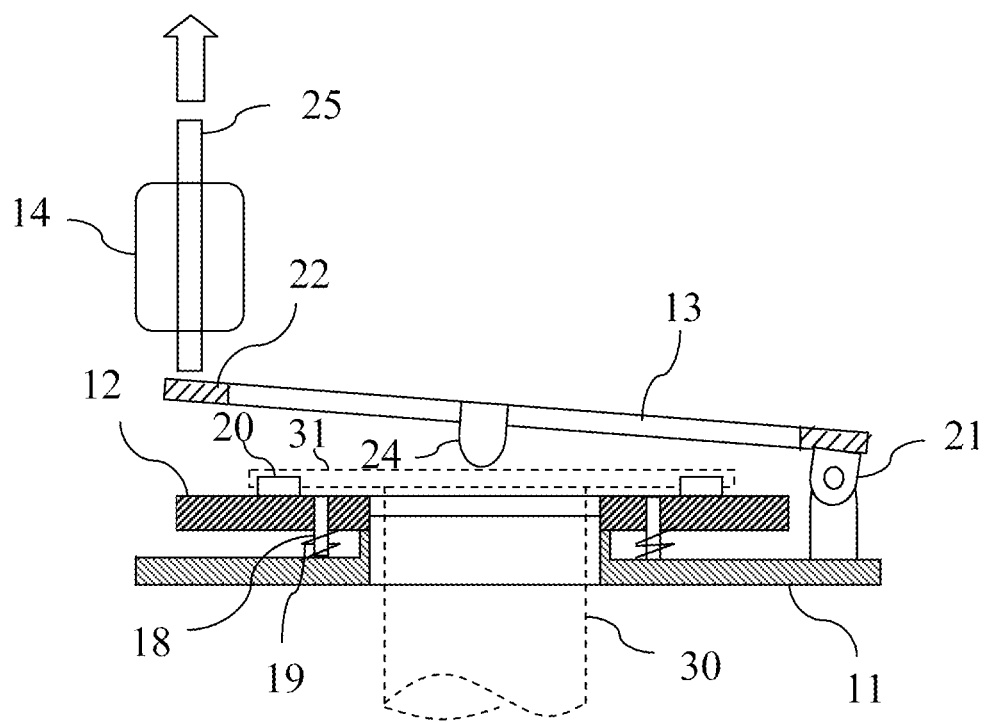
FIG. 3 is a sectional diagram of the brake triggering device at a braking status according to the embodiment of the present application.
Figure 4:
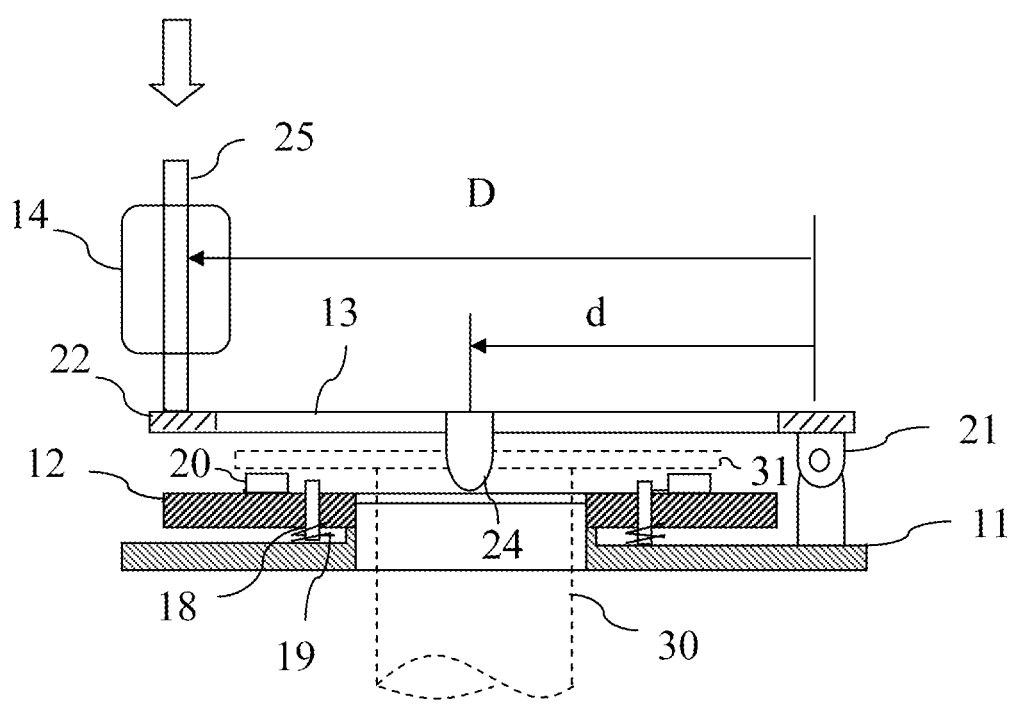
FIG. 4 is a sectional diagram of the brake triggering device at a brake release status according to the embodiment of the present application.
Figure 5:
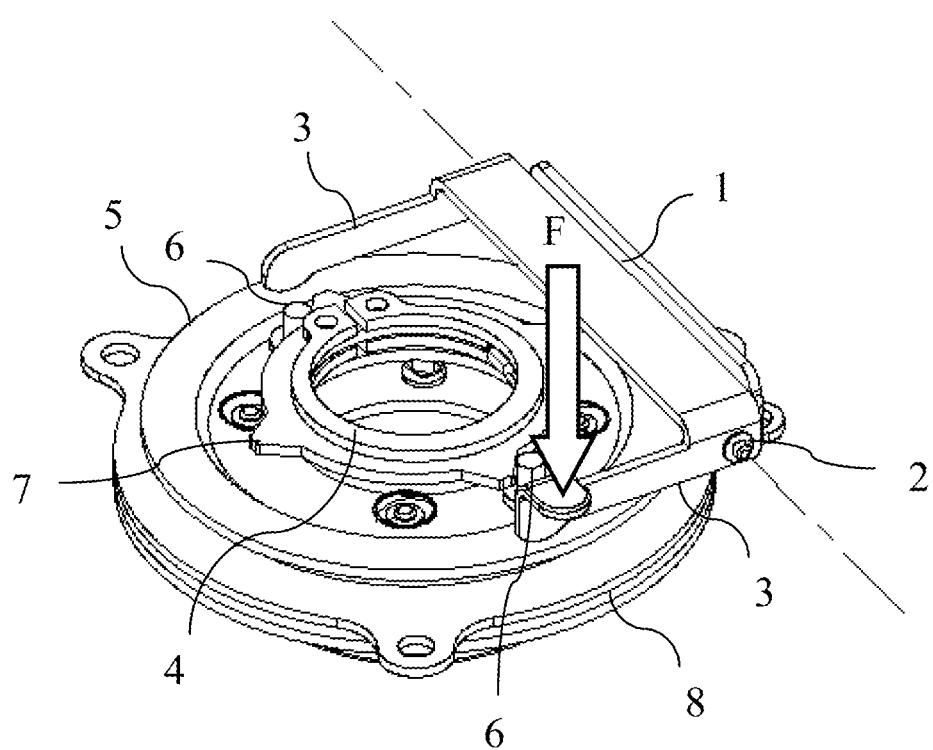
FIG. 5 is a diagram of a conventional brake triggering device in the prior art.

Please refer to FIG. 1, FIG. 2, FIG. 3, and FIG. 4. FIG. 1 is a diagram of a brake triggering device 10 for a robot arm according to an embodiment of the present application. FIG. 2 is a diagram of a controlling plate 13 according to the embodiment of the present application. FIG. 3 is a sectional diagram of the brake triggering device 10 at a braking status according to the embodiment of the present application. FIG. 4 is a sectional diagram of the brake triggering device 10 at a brake release status according to the embodiment of the present application. As shown in FIG. 1, the brake triggering device 10 of the present application includes a brake disk 11, an engaging plate 12, the controlling plate 13, and a solenoid 14. The brake disk 11 includes a central shaft hole 15 for allowing the shaft 30 to pass therethrough and to drive a ratchet 31 to rotate, as shown in FIG. 3. The shaft 30 is stopped from rotation when being braked by a braking friction provided by the brake disk 11. A pivot holder 16 is disposed at an end of the brake disk 16. A plurality of guiding slots 17 are spaced around an inner rim of the central shaft hole 15 of the brake disk 11. A plurality of positioning pins 18 protrude from the brake disk 18 and surround the central shaft hole 15. Restoring springs 19 sleeve the plurality of positioning pins 18, as shown in FIG. 3. The engaging plate 12 is formed in a ring shape. An inner rim of the engaging plate 12 is engaged in the guiding slots 17 of the brake disk 11. Through holes 26 are formed on the engaging plate 12 for allowing the positioning pins 18 to slide through the through holes 26 respectively. The restoring springs 19 positioned between the engaging plate 12 and the brake disk 11 can be pressed or released, and thereby the inner rim of the engaging plate 12 is moved down or up along the guiding slots 17. A plurality of engaging blocks 20 protrude from the engaging plate 12.

The controlling plate 13 is formed in a ring shape. A pivot 21 is disposed at an end of the controlling plate 13, while another end diametrically opposite to the end of the controlling plate 13 is designated to be a movable end 22. The pivot 21 is fixed to the pivot holder 16 of the brake disk 11 via a supporting axle 23, and the moveable end 12 is pivoted around the pivot 21 and above the engaging plate 12. Two pressing protrusions 24 protrude from two sides of the controlling plate 13 and are positioned above the ring-shaped engaging plate 12 respectively. It should be noted that the implementation of the present application includes, but is not limited to, the aforesaid embodiment as a preferred embodiment. The pressing protrusions 24 also can protrude from two sides of an inner rim of the ring-shaped controlling plate 13 respectively or protrude from opposite sides of the controlling plate 13 respectively, where a diametric line connecting between the pressing protrusions 24 is substantially perpendicular to a diametric line connecting between the pivot 21 and the movable end 22 of the controlling plate 13, either of which serves to achieve the objectives of the present application. The solenoid 14 is disposed above the movable end 22 of the controlling plate 13. The solenoid 14 drives an actuating rod 25 to extend out of or to retract into the solenoid 14 via magnetic force, and thereby the movable end 22 of the controlling plate 13 is pushed or released by the actuating rod 25.

Please refer to FIG. 3. When it is desired to brake the robot arm, the brake triggering device 10 of the present application actuates the solenoid 14 to retract the actuating rod 25 for releasing the movable end 22 of the controlling plate 13, and the controlling plate 13 is pivoted upwards around the pivot 21, so that the two pressing protrusions 24 protruding from the two sides of the controlling plate 13 are separated from the engaging plate 12 for releasing the engaging plate 12. The released engaging plate 12 whose inner rim is engaged in the guiding slots 17 is pushed and lifted upwards along the guiding slots 17 by the restoring springs 19. The lifted engaging blocks 20 are lifted upwards with the engaging plate 12 for entering into a rotation path of the ratchet 31 to block the rotation of the ratchet 31 so as to prevent the shaft 30 coupled with the ratchet 31 from rotation via a braking friction provided by the bake disk 11, which achieves the purpose of braking.

Please refer to FIG. 4. When it is desired to release the brake of the robot arm, the brake triggering device 10 of the present application actuates the solenoid 14 to extend out the actuating rod 25 for pushing the movable end 22 of the controlling plate 13, and the controlling plate 13 is pivoted downwards around the pivot 21, so that the two pressing protrusions 24 protruding from the two sides of the controlling plate 13 press against the engaging plate 12 for uniformly transmitting the pressing force from the actuating rod 25 to the engaging plate 12. The engaging plate 12 whose inner rim is engaged in the guiding slots 17 is lowered against the restoring springs 19 and along the guiding slots 17, and the engaging blocks 20 on the engaging plate 12 are lowered along with the engaging plate 12 to leave the rotation path of the ratchet 31. Therefore, the ratchet 31 is freed from being blocked by the engaging blocks 20, and thereby the shaft 30 is allowed to rotate accordingly.

The ring-shaped controlling plate 13 of the brake triggering device 10 of the present application can be substantially formed as a circular ring. The movable end 22, which is actuated by the actuating rod 25 of the solenoid 14, and the pivot 21 are positioned at two ends of the ring-shaped controlling plate 13, and a distance between the movable end 22 and the pivot 21 is substantially equal to a diameter D of the ring-shaped controlling plate 13. Besides, either of the pressing protrusions 24, which protrude from two sides of an inner rim of the controlling plate 13 respectively, is apart from the pivot 21 with a distance substantially equal to a radius d of the ring-shaped controlling plate. Therefore, the configuration of the present application doubles a torque exerted by the actuating rod 25 of the solenoid 14 to a greater extent capable of overcoming a greater friction force between the ratchet 31 and the engaging blocks 20.

In conclusion, the annularly symmetrical structure of the ring-shaped controlling plate of the brake triggering device of the present application not only provides an enhanced structural strength of the controlling plate for better bearing an actuating force from the solenoid but also provides a greater brake triggering torque exerted by the pressing protrusions protruding from the two sides of an inner rim of the controlling plate by designating an end of the ring-shaped controlling plate as a pivot and actuating the opposite end, a movable end, with a solenoid.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A brake triggering device for a robot arm, the brake triggering device comprising:
    a brake disk, a central shaft hole being formed on the brake disk, a pivot holder being disposed at an end of the brake disk, a plurality of positioning pins protruding from the brake disk and surrounding the central shaft hole, and at least one restoring spring sleeving at least one of the plurality of positioning pins;
    an engaging plate, a plurality of through holes being formed on the engaging plate for allowing the plurality of positioning pins to slide through the plurality of through holes respectively, the at least one restoring spring being positioned between the engaging plate and the brake disk, and a plurality of engaging blocks protruding from the engaging plate;
    a controlling plate formed in a ring shape, a pivot being disposed at an end of the controlling plate and disposed in the pivot holder, another end of the controlling plate opposite to the end of the controlling plate being a movable end to be pivoted around the pivot and above the engaging plate, and two pressing protrusions protruding from two sides of the controlling plate and positioned above the engaging plate respectively; and
    a solenoid disposed above the movable end of the controlling plate for pushing or releasing the movable end;
    wherein the solenoid actuates the movable end of the controlling plate to pivot the controlling plate around the pivot for driving the two pressing protrusions at the two sides of the controlling plate to push the engaging plate against the at least one restoring spring or to separate from the engaging plate, so as to lower or lift the plurality of engaging blocks on the engaging plate respectively.

2. The brake triggering device of claim 1, wherein the engaging plate is formed in a ring shape.

3. The brake triggering device of claim 2, wherein a plurality of guiding slots are spaced around the central shaft hole of the brake disk, and an inner rim of the engaging plate is engaged in the plurality of guiding slots.

4. The brake triggering device of claim 1, wherein the pivot is fixed to the pivot holder via a supporting axle.

5. The brake triggering device of claim 1, wherein the solenoid drives an actuating rod to extend out of or to retract into the solenoid for pushing or releasing the movable end respectively.

6. The brake triggering device of claim 1, wherein the brake disk provides a brake friction force for braking via the engaging blocks.

7. The brake triggering device of claim 1, wherein the two pressing protrusions are protruded from two sides of an inner rim of the controlling plate respectively.

8. The brake triggering device of claim 1, wherein the pressing protrusions are protruded from opposite sides of the controlling plate respectively, and a diametric line connecting between the pressing protrusions is substantially perpendicular to a diametric line connecting between the pivot and the movable end of the controlling plate.

9. The brake triggering device of claim 1, wherein the solenoid pushes the movable end of the controlling plate to pivot the controlling plate around the pivot for driving the pressing protrusions at the two sides of the controlling plate to push the engaging plate against the at least one restoring spring so as to lower the plurality of engaging blocks on the engaging plate to stop braking.

10. The brake triggering device of claim 1, wherein the solenoid releases the movable end of the controlling plate to pivot the controlling plate around the pivot for driving the pressing protrusions at the two sides of the controlling plate to release the engaging plate so that the at least one restoring spring lifts the plurality of engaging blocks on the engaging plate for braking.

* * * * *